US008640836B2

(12) United States Patent
Drewes

(10) Patent No.: US 8,640,836 B2
(45) Date of Patent: Feb. 4, 2014

(54) DEVICE FOR SUPPORTING BRAKE SHOES OF A DRUM BRAKE

(75) Inventor: Olaf Drewes, Aschaffenburg (DE)

(73) Assignee: SAF-HOLLAND, GmbH, Bessenbach (DE)

( * ) Notice: Subject to any disclaimer, the term of this patent is extended or adjusted under 35 U.S.C. 154(b) by 46 days.

(21) Appl. No.: 13/379,505

(22) PCT Filed: Jun. 16, 2010

(86) PCT No.: PCT/EP2010/058455
§ 371 (c)(1),
(2), (4) Date: Dec. 20, 2011

(87) PCT Pub. No.: WO2010/149553
PCT Pub. Date: Dec. 29, 2010

(65) Prior Publication Data
US 2012/0103737 A1    May 3, 2012

(30) Foreign Application Priority Data

Jun. 22, 2009  (DE) .......................... 10 2009 027 081

(51) Int. Cl.
*F16D 65/09*    (2006.01)
(52) U.S. Cl.
USPC ......................................... 188/328; 188/341
(58) Field of Classification Search
USPC ................................................ 188/325–342
See application file for complete search history.

(56) References Cited

U.S. PATENT DOCUMENTS

| 1,865,042 | A | | 6/1932 | Pellissier | |
|---|---|---|---|---|---|
| 2,710,076 | A | * | 6/1955 | Russell | 188/330 |
| 4,206,834 | A | * | 6/1980 | Williams | 188/341 |
| 4,679,667 | A | * | 7/1987 | Zawodni | 188/341 |
| 5,443,135 | A | * | 8/1995 | Redgrave | 188/250 F |
| 5,445,250 | A | * | 8/1995 | Koschinat | 188/328 |

FOREIGN PATENT DOCUMENTS

| DE | 2748335 A1 | 5/1979 |
|---|---|---|
| DE | 29704700 U1 | 3/1997 |
| EP | 0482567 A1 | 4/1992 |
| ES | 2002878 A6 | 10/1988 |
| FR | 2627828 | 9/1989 |
| GB | 1007804 A | 10/1965 |

OTHER PUBLICATIONS

International Search Report.

* cited by examiner

*Primary Examiner* — Christopher Schwartz
(74) *Attorney, Agent, or Firm* — Price Heneveld LLP

(57) ABSTRACT

A device for supporting brake shoes of a drum brake of a vehicle, in particular of a utility vehicle or an agricultural machine, includes a brake carrier, a brake lining carrier and a bearing body, wherein the brake lining carrier is arranged on the brake carrier so as to be swivelable across the bearing body in such a way that the brake lining carrier can be pivoted along a plane of swiveling, the inclination of the plane of swiveling to the brake carrier being variable, and wherein the bearing body has a bearing surface which is rotation-symmetrical about its bearing axis and the front faces of the bearing body have fastening portions for arranging the bearing body on the brake carrier or on the brake lining carrier.

20 Claims, 2 Drawing Sheets

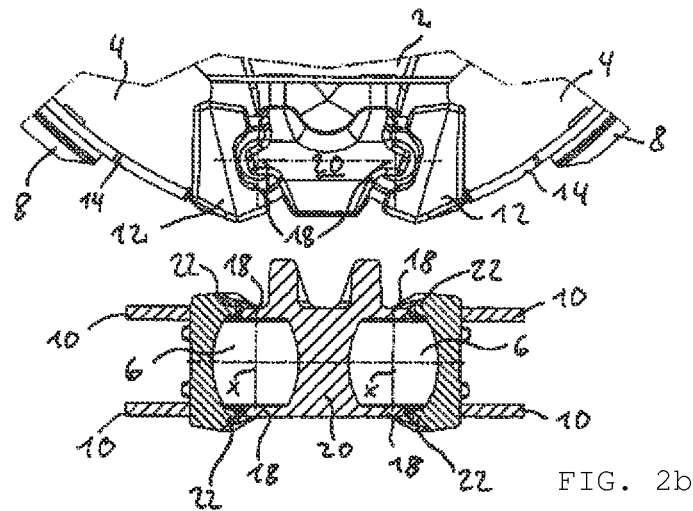
FIG. 2a
FIG. 2b
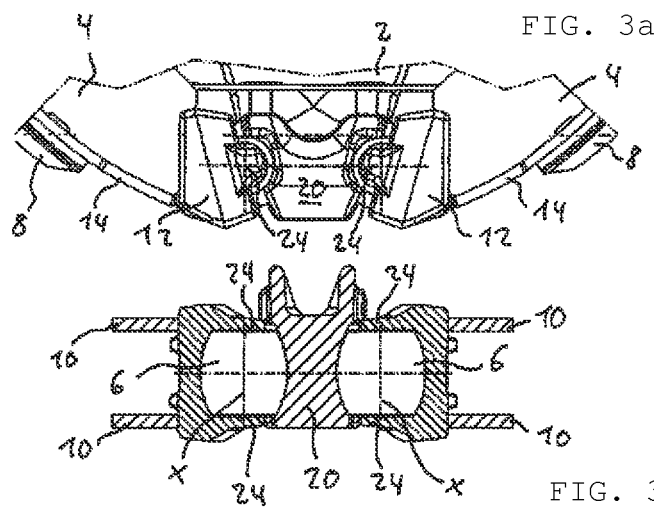
FIG. 3a
FIG. 3b
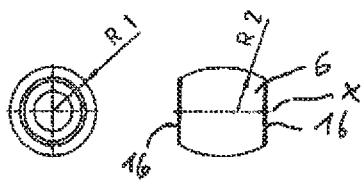
FIG. 4a   FIG. 4b

DEVICE FOR SUPPORTING BRAKE SHOES OF A DRUM BRAKE

BACKGROUND OF THE INVENTION

The present invention relates to a device for supporting brake shoes of a drum brake of a vehicle, in particular a commercial vehicle or an agricultural machine.

Devices of the type in question are known in the prior art. For example, there is known from DE 88 06 286 U a drum brake whose brake lining carrier is arranged on the brake carrier by means of cylindrical bearing journals in such a manner that it is swivelable in a plane. Such a supporting system, however, requires relatively high manufacture and assembly efforts using specialty tools. When the brake is actuated, the brake linings, which are fixed on the brake lining carriers, are pushed against the inside of the brake drum. As a result of the pressure the brake drum is radially enlarged, wherein this enlargement does not occur at a constant rate in the axial direction or longitudinal direction of the axis, but increases towards the open side of the brake drum, which leads to the fact that the brake shoes rest unevenly against the inner surface of the brake drum as well as that the contact pressure is accordingly unevenly distributed and, thus, that the braking power decreases. From EP 0 482 567 A1 there is known a brake shoe supporting system for vehicle drum brakes, wherein the brake lining carrier is arranged on the brake carrier via balls in such a way that it is freely swivelable in space. In order to guide the brake lining carriers along a predetermined path, said device requires a complex guiding system via a cam arrangement so that such a supporting device requires relatively great manufacture and assembly efforts using specialty tools.

Therefore, the object underlying the present invention is to provide a device for supporting brake shoes of a drum brake of a vehicle, in particular a commercial or an agricultural machine, which overcomes the above-mentioned disadvantages and which, in particular, offers an easy to mount and inexpensive to manufacture support system for the brake shoes, whose path of displacement during the braking process is easily predeterminable.

SUMMARY OF THE INVENTION

According to the invention there is provided a device for supporting brake shoes of a drum brake of a vehicle, especially of a utility vehicle or an agricultural machine, comprising a brake carrier, a brake lining carrier and a bearing body, wherein the brake lining carrier is arranged on the brake carrier so as to be swivelable across the bearing body in such a way that the brake lining carrier can be pivoted along a plane of swiveling, the inclination of said plane of swiveling to the brake carrier being variable, wherein the bearing body has a bearing surface which is rotation-symmetrical about its bearing axis, and wherein the front faces of the bearing body have fastening portions for arranging the bearing body on the brake carrier or on the brake lining carrier. The device according to the invention for supporting brake shoes of a drum brake is used in particular in commercial vehicles or agricultural machines, such as trucks or semi-trailers hauled by such trucks, which are designed to transport heavy loads so that—unlike in passenger vehicles—the drum brake has to have a very high braking efficiency. In such vehicle systems, the brake carrier is essentially permanently connected with a rigid or non-rotating axle so that braking torque is introduced into the brake carrier from the brake lining carrier and can be introduced into the frame of the vehicle by fixing or attaching it on the axle or axle body, respectively. To put it differently, the brake carrier, the axle body and the frame of the vehicle form one unit which—relative to the wheel center—is essentially not rotatable relative to each other. At its outer surface, the brake lining carrier has a brake lining, wherein the geometrical outer configuration essentially corresponds to the inner configuration of the brake drum. Via at least one bearing body the brake lining carrier is arranged on the brake carrier such that the latter can be pivoted along a plane of swiveling so that the brake lining carriers may rest against the inner circumference of the brake drum in order to exert a braking force. The bearing body and the brake carrier or brake lining carrier, respectively, are thus designed as separate elements and, expediently, are not designed to form a single piece. In order to compensate for the enlargement of the brake drum, which increases towards the open side thereof, the inclination of the plane of swiveling of the brake lining carrier relative to the brake carrier is variable. To put it differently, it is possible to pivot or tilt the brake lining carrier additionally along an axis lying in the plane of swiveling. Consequently, since the brake lining carrier can be pivoted along a plane of swiveling the inclination of which relative to the brake carrier is variable, the brake lining carrier is guided such that it can move along two degrees of freedom. Unlike in the case of a supporting device using a bearing body designed as a ball, where the brake lining carrier is completely free to move in space (i.e. three degrees of freedom), no further guiding of the brake lining carrier is necessary in the device according to the invention. This is due to the fact that the axis of swiveling of the brake lining carrier may lie essentially parallel to or be inclined with respect to the bearing axis or longitudinal axis or axis of rotation of the axle element or of the drum brake, respectively. The inclination may be at an angle of up to 10°, preferably up to about 6°, and particularly preferably up to about 3°. In order to allow for a rotation of the brake lining carrier relative to the brake carrier along the axis of swiveling, the bearing body comprises a bearing surface which is rotation-symmetrical around the bearing axis or longitudinal axis or axis of rotation thereof, respectively. At its front faces, the bearing body has fastening portions in order to arrange the same on the brake carrier or brake lining carrier. Here, the arrangement may be such that the bearing body is either firmly and unmovably or rotatably and movably, respectively, arranged on the brake carrier or brake lining carrier. In the case of an unmovable arrangement on the brake carrier or brake lining carrier, the bearing body essentially assumes the function of a sliding bearing. In the case of a movable arrangement, the bearing body essentially has the effect of a roller bearing. The bearing surface of the bearing body expediently is that surface which forms a contact surface with the brake carrier or brake lining carrier, respectively. Particularly advantageously, when the brake is activated, due to the coefficient of friction, there is no relative motion between the bearing body and the brake lining carrier so that they are arranged firmly or unmovably relative to each other and, consequently, wear in this area is minimized. Therefore, the bearing body is arranged preferably rotatably or movably relative to the brake carrier so that they may rotate relative to each other. The fastening portions of the bearing body are advantageously provided at essentially oppositely located front faces of the bearing body, which front faces preferably are located essentially on the longitudinal axis or axis of rotation of the bearing body. Here, the fastening portions or front faces of the bearing body, respectively, as regards their surface configuration, are designed different from the bearing surface to make it possible to attach or fix the bearing body.

Advantageously, the bearing body is designed as a barrel body or barrel-shaped or spherical roll. To put it differently, the bearing body is not designed as a cylinder or as a body with a constant cross-section along its longitudinal axis, but as a body which geometrically is generated by rotating a circular arc or a parabola around a longitudinal axis or bearing axis. This results in a non-constant cross-sectional profile along the longitudinal axis. The expediently essentially oppositely located front faces of the bearing body are advantageously flatly designed. Particularly expediently, the front faces may be concavely designed in order to especially easily fix the bearing body.

Advantageously, the bearing surface of the bearing body has an essentially constant curvature. To put it differently, the bearing body, which is for example designed as a barrel body, may have an essentially constant curvature along the bearing surface, which is variably designed only due to manufacturing tolerances.

Alternatively, the bearing surface of the bearing body may have a radius of swiveling which is different from the spherical radius of the bearing surface. Here, the radius of swiveling essentially is the curvature of the bearing surface of the bearing body along a plane of swiveling. Accordingly, the spherical radius is the curvature of the bearing surface of the bearing body along a plane in which the longitudinal axis or axis of rotation of the bearing body lies. To put it differently, the bearing surface of the bearing body preferably is more curved along a plane of swiveling than along a plane lying on the axis of rotation of the bearing body. Such a configuration ensures that the brake lining carrier, due to being supported via the bearing body, can move only within two degrees of freedom and not freely in space (i.e. three degrees of freedom), as would be possible in the case of being supported via a ball. Therefore, no additional complex guiding of the brake lining carrier is required.

Preferably, the bearing surface of the bearing body has a radius of swiveling which is smaller than the spherical radius of the bearing surface. Due to the larger spherical radius or the smaller curvature of the bearing surface of the bearing body, respectively, along a plane which lies on the axis of rotation of the bearing body, it is possible to additionally reduce the surface pressure or Hertzian contact stress between the bearing body and the brake lining carrier or the brake carrier in comparison with a spherical surface or a ball so that it is easier to design and dimension the components and to increase the service life of the components in the bearing area.

Expediently, the relationship of spherical radius to radius of swiveling of the bearing surface is between about 0.1-0.9, preferably about 0.4-0.6, and particularly preferably about 0.5. Such a relationship leads to a particularly favorable compromise between reducing the surface pressure and radius of swiveling as well as spherical radius of the bearing surface and, thus, pivoting of the brake lining carrier, which makes it possible to further increase the functionality of the supporting device according to the invention.

In a further preferred embodiment, the brake lining carrier comprises a receiving portion in order to at least partially accommodate the bearing body therein. Here, particularly expediently, the receiving portion may be formed separate from the brake lining carrier and define an end portion or end section of the brake lining carrier. Thus, it is possible to form the receiving portion from a material which is different from that of the rest of the brake lining carrier, for example as a forging. The bearing body is arranged at least partially in the receiving portion. Since the fastening of the bearing body is provided by means of fastening portions provided at its front faces—contrary to a bearing body formed as a ball—it is no longer necessary to encompass the bearing body along its bearing surface by more than 180°. It is rather preferred that the receiving portion of the brake lining carrier encompasses the bearing surface of the bearing body by less than 180°, which makes it easier to mount the bearing body on the brake lining carrier.

Preferably, the receiving portion of the brake lining carrier comprises fastening sections which come into engagement with the fastening portions of the bearing body. The fastening sections of the brake lining carrier may be formed as projections which engage with recesses of correspondingly concavely designed front faces of the bearing body. Thus, the bearing body is essentially stationarily arranged or fastened relative to the brake lining carrier. The arrangement may be such that the bearing body is arranged on the brake lining carrier in a fixed manner or, alternatively, in a rotatable manner.

In a further preferred embodiment, the brake carrier comprises a receiving portion in order to at least partially accommodate the bearing body therein. Here, the receiving portion of the brake carrier may particularly expediently be formed separate from the brake carrier and define an end portion or end section of the brake carrier. Thus, it is possible to design the receiving portion from a material different from that of the rest of the brake carrier, for example as a forging. The bearing body is at least partially arranged in the receiving portion. Since it is provided that the bearing body is fastened by means of fastening portions provided at front faces thereof—contrary to a bearing body designed as a ball—it is no longer necessary to encompass the bearing body along its bearing surface by more than 180°. It is rather preferred that the receiving portion of the brake carrier encompasses the bearing surface of the bearing body by less than 180°, which makes it easier to mount the bearing body on the brake carrier.

Preferably, the receiving portion of the brake carrier comprises fastening sections which come into engagement with the fastening portions of the bearing body. The fastening sections of the brake carrier may be formed as projections which engage with recesses of correspondingly concavely designed front faces of the bearing body. Thus, the bearing body is essentially stationarily arranged or fastened relative to the brake carrier. The arrangement may be such that the bearing body is arranged on the brake lining carrier in a fixed manner or, alternatively, in a rotatable manner.

Advantageously, the curvature of the receiving portion of the brake carrier and/or brake lining carrier ends in two projections, which at least partially encompass the bearing body. To put it differently, there may be provided a configuration in which the bearing body is fastened by means of fastening sections provided in the brake lining carrier so that the curvature of the receiving portion of the brake carrier ends in two projections which at least partially (loosely) encompass the bearing body. Accordingly, in a configuration in which the bearing body is fastened via fastening sections of the brake carrier, it may be arranged in a receiving portion of the brake lining carrier, the curvature of which ends in two projections (loosely) encompassing the bearing body Here, the projections are designed such that, starting from a certain inclination of the plane of swiveling relative to the brake carrier or a clear tilting of the brake carrier, they come into engagement with the bearing body and, thus, prevent a further inclination or tilting. Thus, it is additionally made easier to mount the brake drum.

These and other advantages of the invention will be further understood and appreciated by those skilled in the art by reference to the following written specifications, claims and appended drawings.

Further advantages and features of the present invention result from the following description of preferred embodiments with reference to the appended Figures, wherein individual features of embodiments may be combined to form new embodiments.

BRIEF DESCRIPTION OF THE DRAWINGS

FIG. 2a a side view of the first embodiment of the device according to the invention.

FIG. 2b a cross-sectional view of the first embodiment of the invention according to the invention.

FIG. 3a a side view of a second embodiment of the device according to the invention.

FIG. 3b a cross-sectional view of the second embodiment of the device according to the invention.

FIG. 4a a top plan view and of a bearing body according to the invention.

FIG. 4b a side view of the bearing body according to the invention.

DETAILED DESCRIPTION OF THE PREFERRED EMBODIMENT

Figure 1:
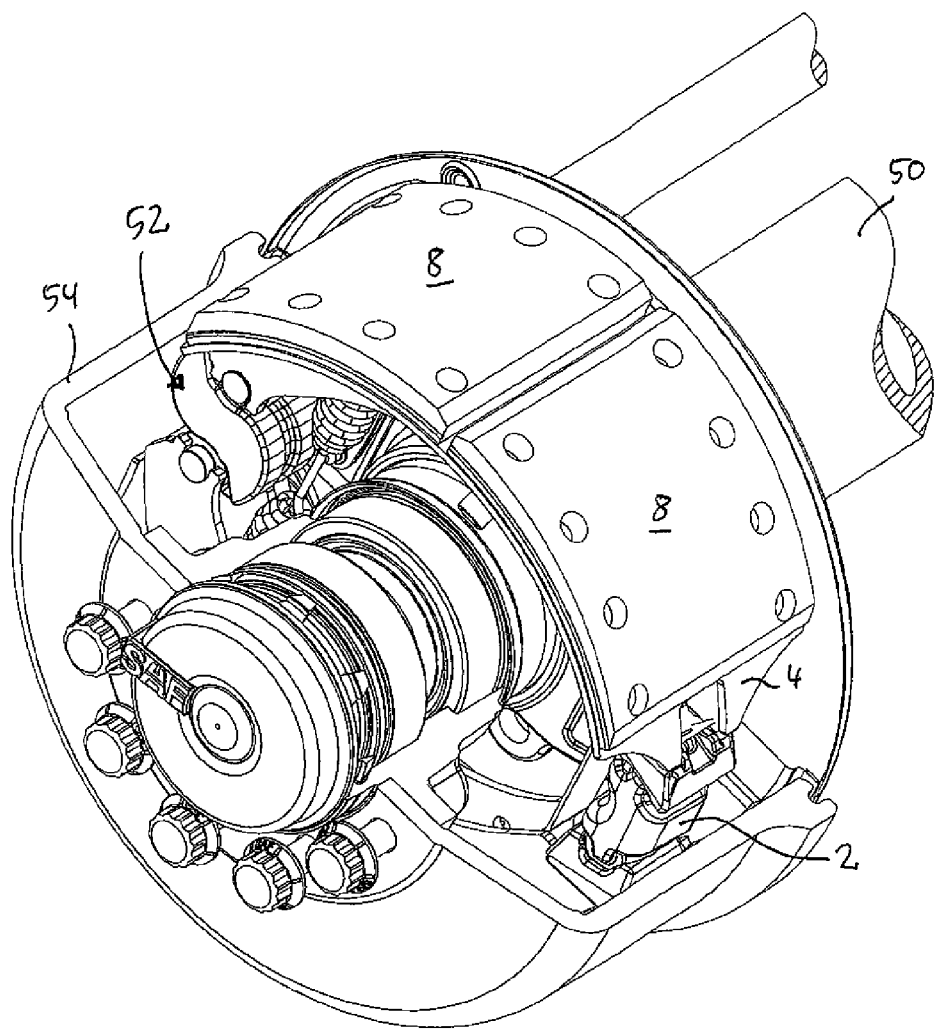
FIG. 1 a partially cut perspective view of a brake drum with a first embodiment of the device according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

FIGS. 1 and 2a show an exemplary, preferred embodiment of a drum brake with the device according to the invention for supporting brake shoes. The device comprises a brake carrier 2 and a brake lining carrier 4, which are arranged on the brake carrier 2 via at least one bearing body 6 (FIG. 2b.

The brake carrier 2 is arranged essentially non-rotatably on an axle body 50, which, in turn—relative to the wheel center—is connected with a frame of the vehicle in an non-rotatable manner. When the actuating mechanism 52 is actuated, the brake lining 8, which is arranged on the outside of the brake lining carrier 4, is pushed against the inner surface of the brake drum 54.

As can be seen, there are provided two brake lining carriers 4 which essentially consist of two webs 10 each, which are parallel to each other, a receiving portion 12 fastened thereto and connecting the webs 10 and a lining sheet 14, on which there is attached in a preferably interchangeable manner a brake lining 8, which by means of bracing the brake lining carriers 4 can be pushed against the brake drum inner surface in order to initiate the braking process.

In order to make it possible to pivot the brake lining carrier 4 along a plane of swiveling, it is arranged on the brake carrier 2 via the bearing body 6. To this end, the bearing body 6 may be arranged or fastened either on the brake carrier (FIGS. 2a and 2b) or on the brake lining carrier 4 (FIGS. 3a and 3b).

The bearing body 6 is formed as a barrel-shaped roll and comprises along the axis of rotation X thereof two front faces 16 which are essentially opposite each other. The front faces 16 advantageously may be designed concavely so that, in the embodiment shown in FIGS. 2a and 2b, a fastening section 18 of the receiving portion 20 of the brake carrier 2 may protrude into or come into engagement with the recess formed as a result so as to fix the bearing body 6 on the brake carrier 2 in a fixed manner or preferably such that it can be rotated relative to the brake carrier.

The receiving portion 12 of the brake lining carrier 4 has a curvature which ends in two projections 22 encompassing the bearing body 6 at least partially at its front faces 16. As a result, due to the engagement between the projection 22 and the bearing body 6, there is prevented a tilting of the brake lining carrier 4 which exceeds the allowable measure.

In the embodiment shown in FIGS. 3a and 3b, the bearing body 6 is arranged on the brake lining carrier 4 rotatably relative thereto or preferably in a fixed manner, e.g. due to the friction. To this end, the brake lining carrier 4 comprises fastening sections 24 at its receiving portion 12, which fastening sections 24 are in engagement with fastening portions provided at the front faces 16 of the bearing body 6.

In FIGS. 4a and 4b there is provided a preferred, exemplary embodiment of a bearing body 6 according to the invention. The bearing body 6 is designed as a barrel body and expediently comprises a bearing surface whose radius of swiveling R1 is smaller than the spherical radius R2. As a result, particularly advantageously, the surface pressure between the bearing body 6 and the adjacent elements is reduced.

The invention claimed is as follows:

1. A device for supporting brake shoes of a drum brake of a vehicle, comprising a brake carrier;
   a brake lining carrier; and
   a bearing body;
   wherein the brake lining carrier is arranged on the brake carrier so as to be swivelable across the bearing body in such a way that the brake lining carrier can be pivoted along a plane of swiveling, the inclination of the plane of swiveling to the brake carrier being variable, wherein the bearing body has a bearing surface which is rotation-symmetrical about a bearing axis of the bearing body, and wherein there are provided fastening portions at oppositely arranged front faces of the bearing body for accommodating the bearing body at least partially in at least a select one of a receiving portion of the brake lining carrier and a receiving portion of the brake carrier.

2. The device according to claim 1, wherein the bearing body comprises at least a select one of a barrel-shaped and spherical roll.

3. The device according to any one of claim 2, wherein the bearing surface of the bearing body has a radius of swiveling which differs from a spherical radius of the bearing surface.

4. The device according to claim 3, wherein the bearing surface of the bearing body has a radius of swiveling which is smaller than the spherical radius of the bearing surface.

5. The device according to claim 4, wherein the relationship of spherical radius to radius of swiveling of the bearing surface of the bearing body is between about 0.1 to about 0.9.

6. The device according to any claim 5, wherein the receiving portion of the brake lining carrier comprises fastening sections that engage the fastening portions of the bearing body.

7. The device according to claim 6, wherein the receiving portion of the brake carrier comprises fastening sections that engage the fastening portions of the bearing body.

8. The device according to claim 7, wherein the curvature of at least a select one of the receiving portion of the brake lining carrier and the receiving portion of the brake carrier ends in two projections which at least partially encompass the bearing body.

9. The device according to claim 5, wherein the relationship of spherical radius to radius of swiveling of the bearing surface of the bearing body is between about 0.4 to about 0.6.

10. The device according to claim 9, wherein the relationship of spherical radius to radius of swiveling of the bearing surface of the bearing body is about 0.6.

11. The device according to claim 9, wherein the relationship of spherical radius to radius of swiveling of the bearing surface of the bearing body is about 0.6.

12. The device according to claim 2, wherein the bearing surface of the bearing body includes a substantially constant curvature.

13. The device according to any one of claim 1, wherein the bearing surface of the bearing body has a radius of swiveling which differs from a spherical radius of the bearing surface.

14. The device according to claim 13, wherein the bearing surface of the bearing body has a radius of swiveling which is smaller than the spherical radius of the bearing surface.

15. The device according to claim 14, wherein the relationship of spherical radius to radius of swiveling of the bearing surface of the bearing body is between about 0.1 to about 0.9.

16. The device according to claim 15, wherein the relationship of spherical radius to radius of swiveling of the bearing surface of the bearing body is between about 0.4 to about 0.6.

17. The device according to claim 1, wherein the bearing surface of the bearing body includes a substantially constant curvature.

18. The device according to any claim 1, wherein the receiving portion of the brake lining carrier comprises fastening sections that engage the fastening portions of the bearing body.

19. The device according to claim 1, wherein the receiving portion of the brake carrier comprises fastening sections that engage the fastening portions of the bearing body.

20. The device according to claim 1, wherein the curvature of at least a select one of the receiving portion of the brake lining carrier and the receiving portion of the brake carrier ends in two projections which at least partially encompass the bearing body.

* * * * *

UNITED STATES PATENT AND TRADEMARK OFFICE
CERTIFICATE OF CORRECTION

PATENT NO.       : 8,640,836 B2                                Page 1 of 1
APPLICATION NO.  : 13/379505
DATED            : February 4, 2014
INVENTOR(S)      : Olaf Drewes It is certified that error appears in the above-identified patent and that said Letters Patent is hereby corrected as shown below:

In the Specification

*Column 4, line 57;

"body" should be --body.--.

*Column 5, line 19;

"view and of" should be --view of--.

*Column 5, line 44;

"(Fig. 2b." should be --(Fig. 2b)--.

*Column 5, line 47;

"an" should be --a--.

In the Claims

*Column 6, claim 3, line 50;

"according to any one of claim" should be --according to claim--.

*Column 6, claim 6, line 59;

"according to any claim" should be --according to claim--.

*Column 7, claim 13, line 16;

"according to any one of claim" should be --according to claim--.

*Column 8, claim 18, line 10;

"according to any claim" should be --according to claim--.

Signed and Sealed this
Third Day of February, 2015

Michelle K. Lee
*Deputy Director of the United States Patent and Trademark Office*